United States Patent
Butterfield

(10) Patent No.: US 7,056,248 B2
(45) Date of Patent: Jun. 6, 2006

(54) SILENT CHAIN

(75) Inventor: Roger P. Butterfield, Trumansburg, NY (US)

(73) Assignee: BorgWarner Inc., Auburn Hills, MI (US)

( * ) Notice: Subject to any disclaimer, the term of this patent is extended or adjusted under 35 U.S.C. 154(b) by 286 days.

(21) Appl. No.: 10/650,539

(22) Filed: Aug. 28, 2003

(65) Prior Publication Data

US 2005/0049097 A1    Mar. 3, 2005

(51) Int. Cl.
*F16G 13/04*    (2006.01)
(52) U.S. Cl. .................... 474/212; 474/230
(58) Field of Classification Search ........ 474/212–217, 474/206, 226, 228–231; 59/4–5, 78
See application file for complete search history.

(56) References Cited

U.S. PATENT DOCUMENTS

| | | | |
|---|---|---|---|
| 1,586,857 A | 6/1926 | Stiansen | |
| 1,658,602 A | 2/1928 | Koelkebeck | |
| 1,945,357 A * | 1/1934 | Pierce | 474/231 |
| 1,956,942 A * | 5/1934 | Belcher et al. | 474/213 |
| 2,047,833 A * | 7/1936 | Pierce | 474/217 |
| 2,466,639 A * | 4/1949 | Focke et al. | 474/231 |
| 2,498,788 A * | 2/1950 | Bremer | 474/228 |
| 2,667,791 A * | 2/1954 | Bremer | 474/214 |
| 3,153,348 A | 10/1964 | Kuntzmann | 74/255 |
| 3,661,025 A * | 5/1972 | Avramidis | 474/217 |
| 4,117,738 A * | 10/1978 | McKeon | 474/228 |
| 4,463,550 A | 8/1984 | Avramidis | 59/84 |
| 4,906,224 A * | 3/1990 | Reber | 474/213 |
| 5,176,587 A * | 1/1993 | Mott | 474/216 |
| 5,382,199 A * | 1/1995 | Ducharme | 474/231 |
| 5,690,571 A | 11/1997 | Mott | 474/212 |
| 5,800,301 A | 9/1998 | Anderson | 474/213 |
| 5,989,141 A * | 11/1999 | Kozakura et al. | 474/213 |
| 6,393,820 B1 * | 5/2002 | Varnam et al. | 59/78 |
| 6,450,911 B1 | 9/2002 | Saitou | 474/213 |
| 6,485,385 B1 | 11/2002 | Shimaya | 474/213 |
| 6,733,410 B1 * | 5/2004 | Saito | 474/212 |

* cited by examiner

*Primary Examiner*—Marcus Charles
(74) *Attorney, Agent, or Firm*—Brown & Michaels, PC; Greg Dziegielewski

(57) ABSTRACT

A Hybrid Roller/Silent chain that has the wear resistance of a roller chain combined with the noise performance of a silent chain. This is accomplished with the use of bushings that allow increased bearing area for the articulating members of the chain, specifically by allowing load to be transmitted through both the inside and outside diameter of the bushing in the same plane.

10 Claims, 7 Drawing Sheets

Prior Art

Prior Art

SILENT CHAIN

BACKGROUND OF THE INVENTION

1. Field of the Invention

The invention pertains to the field of silent chains. More particularly, the invention pertains to an improvement over a commonly available silent chain. Yet more particularly, the invention pertains to an improvement over a commonly available silent chain having bushings that permit increased bearing area for articulating members of the chain.

2. Description of Related Art

Roller chains and silent chains are known. Both types of chains have known applications in the automobile industry.

U.S. Pat. No. 6,450,911 B2 teaches a peripheral surface of a silent chain including a number of interleaved rows of link plates articulately connected together by joint pins. Each of the link plates has a pair of teeth and a pair of pin holes. The link plate further has a tubular portion protruding continuously from one surface of the link plate and defining a peripheral surface of each of the pin holes. The tubular portion has a height substantially equal to the thickness of the link plate. The tubular portion increases the contact area between the plate and the joint pin and thus suppresses wear on the joint pin. Further, by the tubular portion, the plate can retain sufficient rigidity and strength without narrowing the web width between each pin hole and the outside flank or the inside flank of the corresponding tooth. The silent chain as a whole is relatively light in weight.

However, the peripheral surface of U.S. Pat. No. 6,450,911 B2 has disadvantages including increased width of each strand of chain. Further, it would inherently require more elaborate manufacturing procedure to produce the chain links.

U.S. Pat. No. 6,485,385 B2 teaches three structural components jointly constituting a single guide link of a silent chain i.e., two guide plates, at least one guide link plate disposed between the guide plates, and two round connector pins press-fitted in the guide plates are constructed to satisfy the expression $(Pm+Dm-Dp')-Pg'=0$ where $Pm$ is the link plate pitch represented by the distance between pin hole centers in the guide link plate, $Dm$ is the inside diameter of the pin holes in the guide link plate, $Dp'$ is the outside diameter between the round connector pins press-fitted in each guide plate, and $Pg'$ is the post-press-fitting guide plate pitch represented by the distance between pin hole centers in each guide plate press-fitted with the round connector pins. In an assembled condition of the silent chain, each round connector pin extends straight with its outer peripheral surface being in contact with the inner peripheral surface of the mating pin hole of the guide link plate and articular links (the articular links are the ones that move relative to the pin and create the bearing area).

However, the pin outer peripheral surface in contact with the inner peripheral surface of the mating pin hole of the guide link plate and the articular links has disadvantages including the bearing surface area is still restricted to the above described contact.

In the chain industry, there is continued search for better performance in silent chains. One desirable feature of a silent chain is to increase the contact or bearing surface of the articulating components of a chain.

A cross sectional view of a bush type roller chain is shown in FIG. 1. Roller chains typically have very good wear properties due to the full length bearing between a pin 14 and a bushing 12. As pin 14 rotates within bushing 12, pin 14 is well supported along the entire length of the bushing 12. The close fit between the pin 14 and bushing 12 provides good wear resistance. The roller chain further includes links 16 and links 18. Link 16 is also known as a bush row link. Link 18 is also known as a pin row link.

Noise generated by chain drives comes from a variety of sources. In roller chain drives, the noise can be caused, in part, by the impact sound generated by the collision of the chain and the sprocket at the onset of meshing. The loudness or the noise level of the impact sound is affected by, among other things, the impact velocity between the chain and the sprocket (not shown) engaging the chain. The mass of chain rollers contacting the sprocket at a particular moment or time increment affect the noise level as well.

Many efforts have been made to decrease the overall noise level and pitch frequency noise distribution in automotive chain drives to thereby minimize the objectionable effects of the pure sonic tones. Silent chains are typically used in automotive applications where noise generation must be minimized. Modifications of the link flank shape and profile are known to have been used to minimize noise.

Roller chains are also known to be used in automotive applications. However, roller chains are usually limited to applications where noise generation may not be of the primary concern. Roller chains are characterized by the resistance to wear exhibited by their components.

A typical silent chain is shown in FIGS. 2a and 2b. The silent chain includes guide link rows and non-guide link rows alternately connected together in an endless fashion. Typically, the guide link rows each have a pair of guide plates 15 and at least one inside link plate 13 disposed between the guide plates. The guide plates 15 and the inside link plate 13 each have a pair of pin holes or apertures 19 spaced in the direction of travel of the silent chain. The non-guide link rows typically have two or more inside link plates 11. The non-guide row inside link plates 11, like the guide plates 15 and the guide row inside link plates 13, each have a pair of spaced pin holes 19. The guide plates 15, the guide row inside link plates 13 and the non-guide row inside link plates 11 are articulately connected together by a connector pin 17 inserted through the laterally aligned pin holes 19 of the non-guide row inside link plates and guide row inside link plates. The connector pin 17 may be a round pin or a pair of rocker joint pins.

Silent chains generally have poor wear performance due to the relatively short and poor quality bearing area between the non-guide row inside link plates and the pin. The available bearing length is significantly less than a roller chain having the same total width. Further, in silent chains, the bearing surface is typically made up of several inside link apertures, rather than the continuous bushing bore used in a roller chain.

One exemplified usage of the silent chain is in transmitting power between a driving sprocket and a driven sprocket through meshing engagement of the chain with the sprockets. By way of a practical example, the silent chain is wound around a crankshaft sprocket and a camshaft sprocket of an automobile engine, or around the sprockets of a transfer unit. When the silent chain starts to mesh with the sprocket, noises occur due to such occurrences as collision between the flank surface of each link plate and the tooth flank of the sprocket.

One of the known advantages of a silent chain is the improved NVH (noise, vibration, harshness) characteristics due to the engagement of the silent chain tooth flank on the sprocket. On the other hand, roller chains have their own advantageous characteristics as well (see supra). As can be appreciated, it is desirable to combine the useful characteristics of roller chain and silent chain in a unique manner to provide an improved silent chain in that wear characteristics of a roller chain and the NVH characteristics of a silent chain are combined. Further, it is desirable to provide superior wear characteristics to a roller chain by providing increased total bearing area between articulating components of the chain.

SUMMARY OF THE INVENTION

An improved silent chain is provided having better wear properties than a roller chain, and much better wear properties than a conventional silent chain.

An improved silent chain is provided possessing noise, vibration, harshness (NVH) characteristics of a conventional silent chain.

An improved silent chain is provided having similar weight to a conventional silent chain.

Accordingly, a chain assembly having a first set of links, each link having a pair of apertures, wherein each aperture is disposed to receive a bushing having an inner diameter with an inner surface and an outer diameter with an outer surface, the bushing being interposed between each aperture and a pin; and a second set of links, each link having a pair of apertures, wherein each aperture is disposed to receive the bushing having the inner diameter with the inner surface and the outer diameter with the outer surface, the bushing being interposed between each aperture and the pin is provided. The chain assembly further includes a set of outside links positioned on the outside of the chain assembly having the first set of links and the second set of links interposed therebetween. The pin has a surface disposed to contact the inner surface of the bushing. The outer surface of the bushing is disposed to contact and move relative to a surface of the inner walls of the each aperture of each of the second set of links. Thereby increased bearing surface and improved silent chain characteristics are provided. The improved characteristics include better wear properties than a roller chain, and much better wear properties than a conventional silent chain. The noise, vibration, harshness (NVH) characteristics of a conventional silent chain are maintained.

DETAILED DESCRIPTION OF THE INVENTION

The present invention combines characteristics of the prior art roller chains and silent chains in a unique manner in that the wear characteristics of a roller chain and the NVH characteristics of a silent chain are combined into an inventive whole. The combined whole of the present invention provides increased total bearing area between articulating components of the chain, thereby providing superior wear characteristics to a roller chain.

Figure 1:
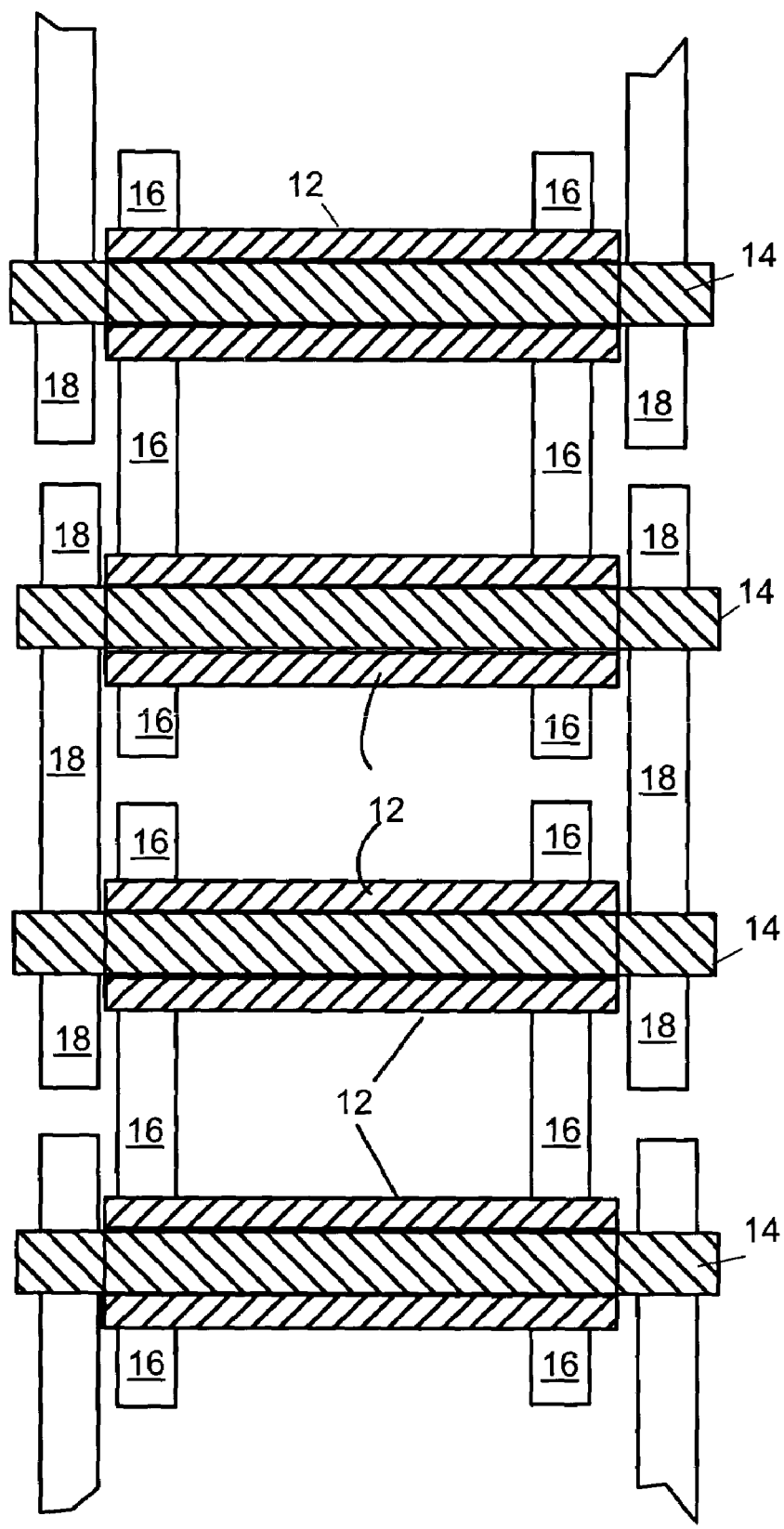
FIG. 1 shows a cross sectional view of a prior art bush type roller chain.
Figure 2A:
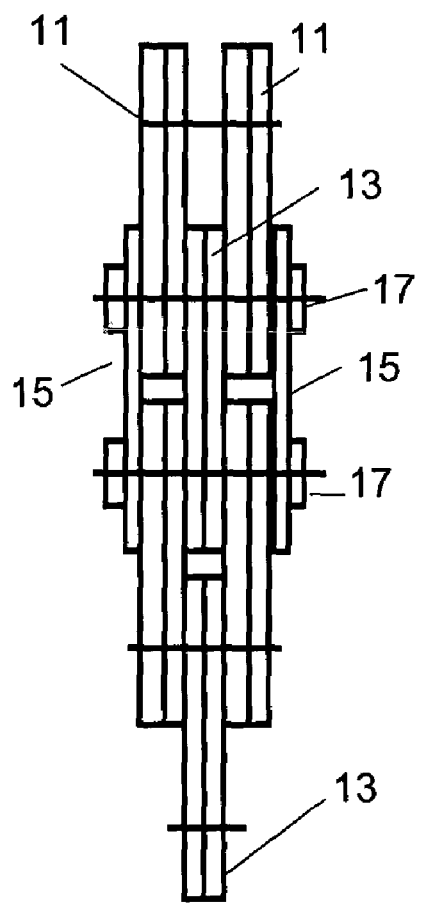
FIGS. 2a and 2b show a top and side view of a typical prior art silent chain.
Figure 2B:
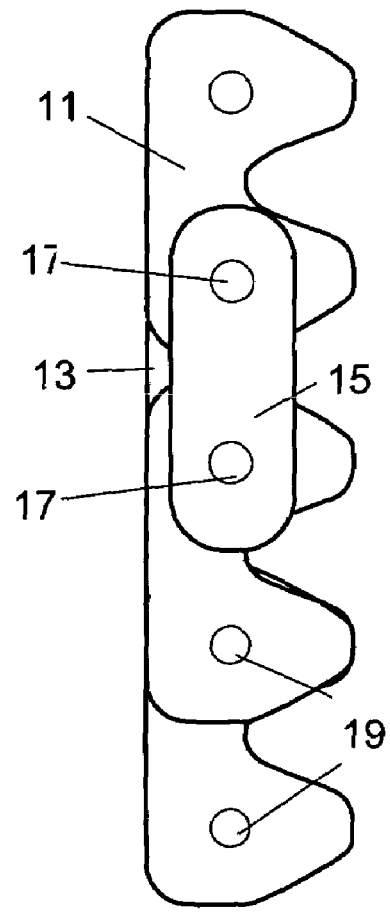
Figure 3:
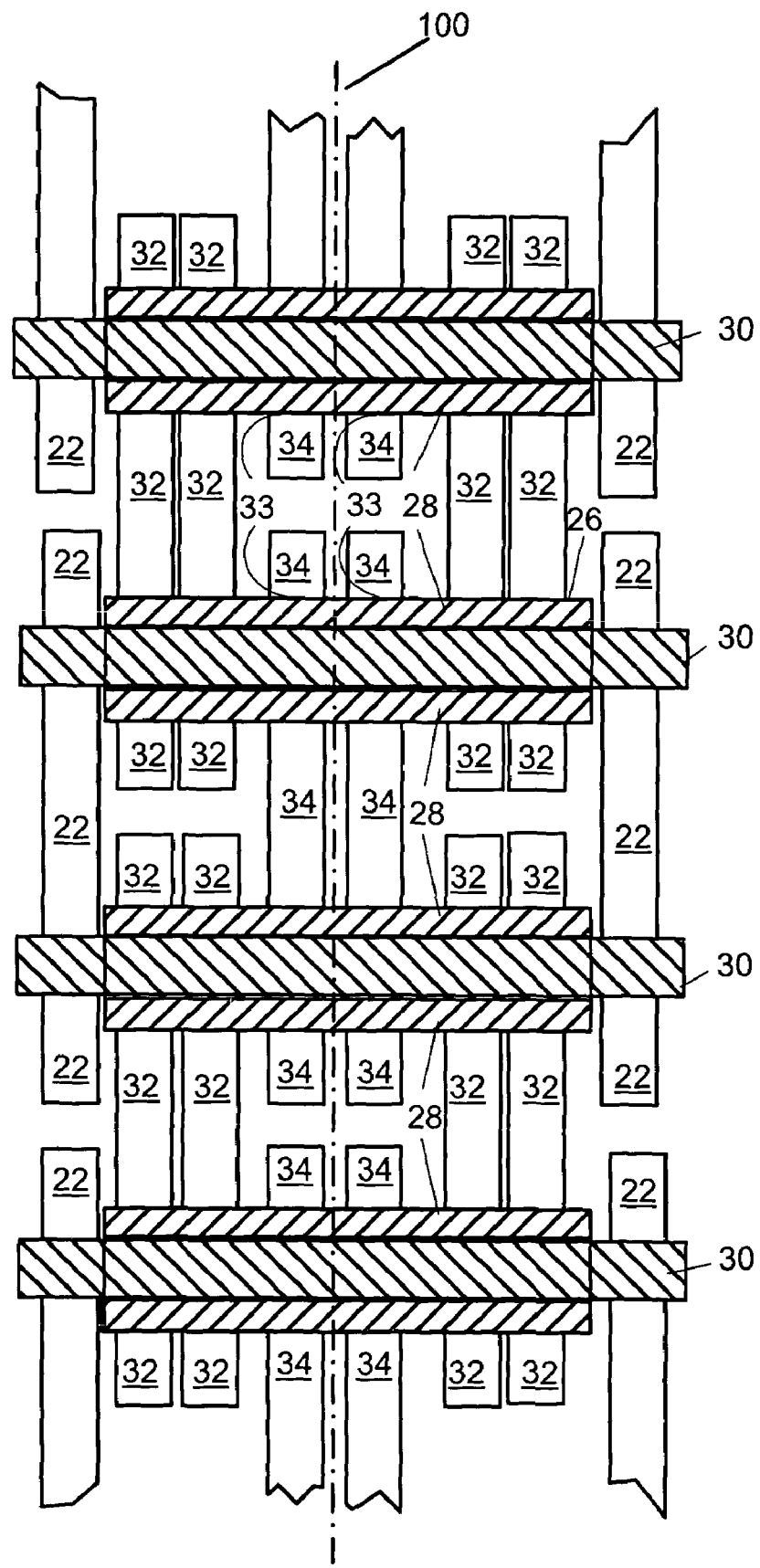
FIG. 3 shows a cross-sectional view of the preferred embodiment of the present invention.

One embodiment of the present invention that discloses the fundamental concept is shown in FIG. 3. In this first embodiment, a set of links are provided. Two pairs of inside links (ISL) 32 on the non-guide row are provided. Two inside links (ISL) 34 on the guide row are also provided. Additionally, a pair of outside guide links 22 are provided. Links 34 are located in the center of the endless chain having a center line 100 partitioning the two links 34. Center line 100 also partitions links 22 and links 32.

In the present figure, the chain may be guided on a sprocket (not shown) by the pair of guide links 22. Each link including guide link 22 has a pair of apertures or annular openings at each end. Within each aperture, there is a surface. Further, each aperture receives a connecting member such as a pin 30, or bushing 28, for connecting various links into an endless chain. Each link 32 has a pair of apertures or annular openings at each end. Within each aperture of link 32, there is a surface press fit over a bushing 28 in which no relative movement therebetween occurs. Each link 34 has a pair of apertures or annular openings at each end. Within each aperture of link 34, there is a surface 33 used as a bearing area over the bushing 28 in which relative movement therebetween occurs.

A set of bushings 28 is interposed between some of the links and pin 30. Specifically, links 32 and links 34 have bushings 28 interposed between their apertures and pin 30. Bushing 28 comprises an outside surface 26 and an inside surface (see FIG. 7). The outside surface 26 is defined by a set of points distributed on the O.D. (outside diameter) of bushing 28. The inside surface is defined by a set of points distributed on the I.D. (inside diameter) of bushing 28. Two links 34 are provided in the present figure. In each aperture of link 34, an inside surface is defined as a bearing area 33 which comes in contact with the outside surface 26 of bushing 28. This contact is not rigidly affixed and allows relative movement of the two contacting surfaces. Additional four links 32 are provided in the non-guide row, which are interposed between the pair of links 34 and the pair of links 22. Links 34 and links 32 are of the inverted tooth type. However, each aperture of the links 32 is rigidly affixed upon bushing outside surface 26 of the bushing 28 that comes in contact therewith.

As can be appreciated, the present invention provides links 34 which possess apertures with inner surfaces that fit over the outside surface 26 of bushings 28, thereby providing additional bearing area to carry load for the chain assembly as a whole. The total bearing area of the present invention is the sum of the pin 30 to bushing 28 bearing area (the area disposed for contact between the inner surface of bushing 28 and an outer surface of pin 30), and the bushing 28 to link 34 bearing area 33 (the area disposed for contact between the outer surface 26 of bushing 28 and the inner surface of the annular openings of link 34). As can be seen, by allowing part of the tensile load in the chain to be carried by the pin 30 to bushing 28 interface, and the remainder of the tensile load to be carried by link 34 to bushing 28 outside diameter (O.D.) interface, the net unit load between pin 30 and bushing 28 is reduced, when compared to a conventional roller chain, thereby causing reduced wear of the relevant portions of the resultant endless chain. The torque transmitting contact between the chain and sprocket is through the inverted tooth links (32,34), thereby providing the NVH performance of a silent chain.

Figure 4:
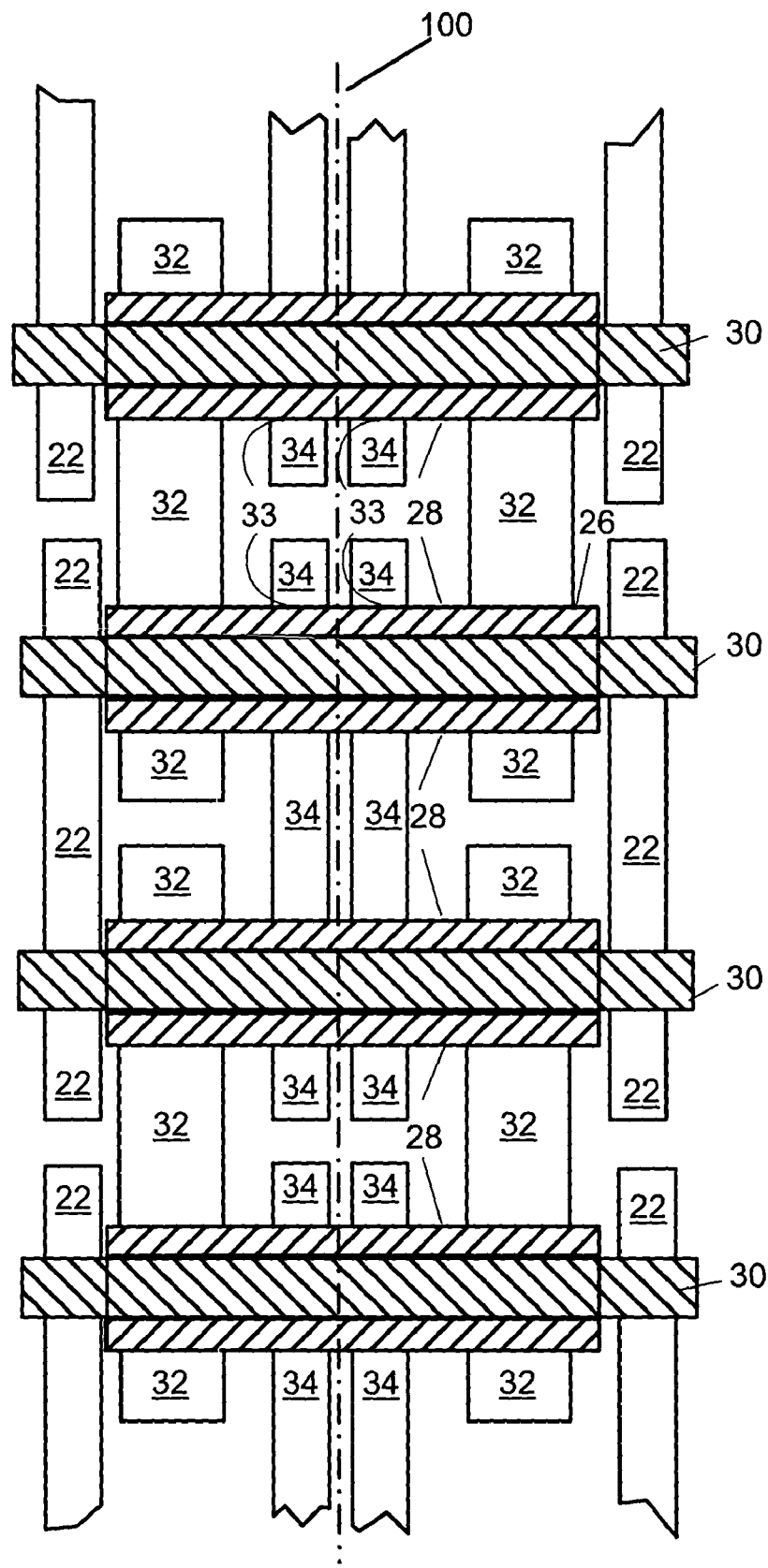
FIG. 4 shows a cross-sectional view of a second embodiment of the present invention.

A second embodiment is shown in FIG. 4. Similar to FIG. 3, an endless chain having links 22, 32, and 34 are provided. Additionally, bushings 28 and pins 30 are provided as well. As can be seen, only two links 32 are used in each non-guide row. Each link 32 is interposed between link 22 and link 34. All the pairs of links are substantially symmetrical with respect to center line 100.

Figure 5A:
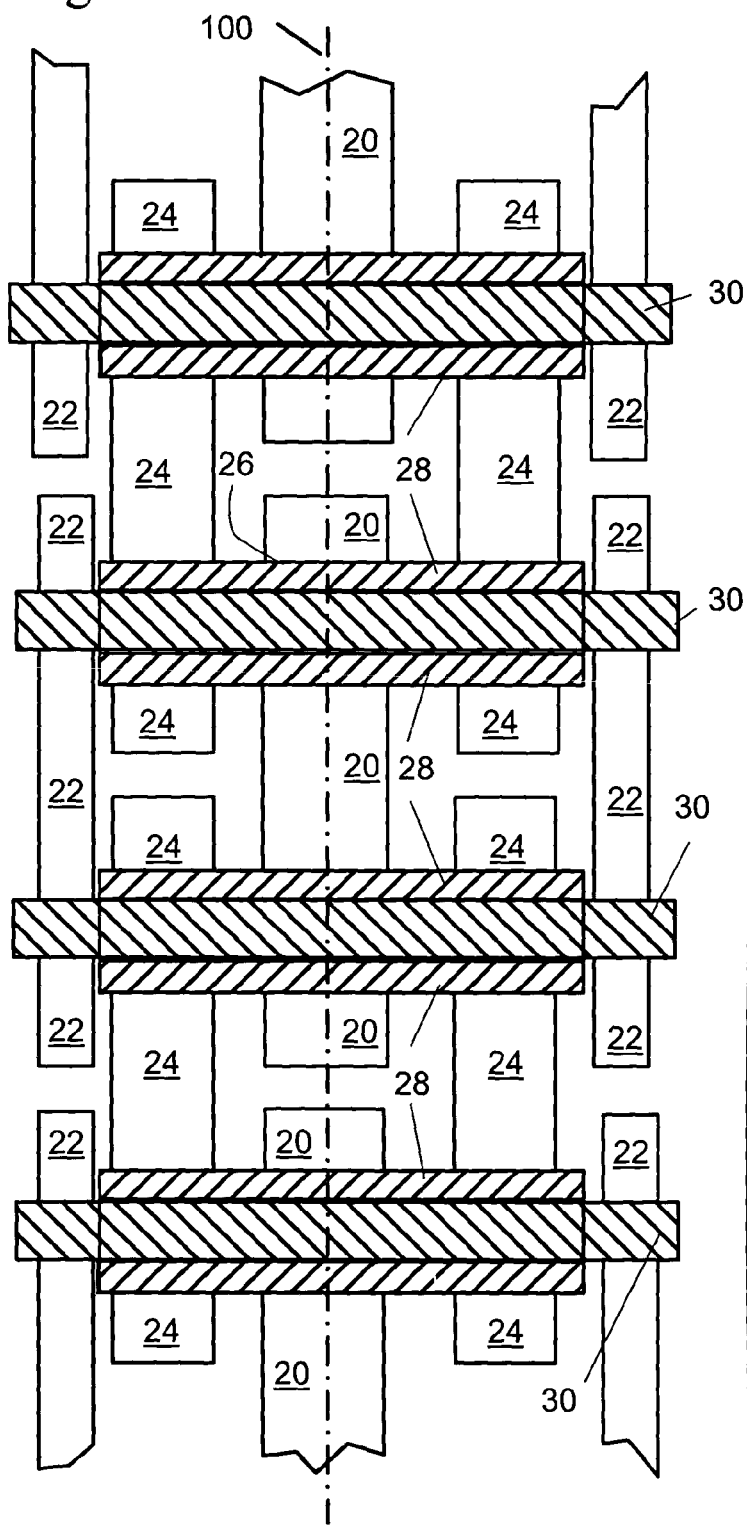
FIG. 5a shows a cross-sectional view of a third embodiment of the present invention.
Figure 5B:
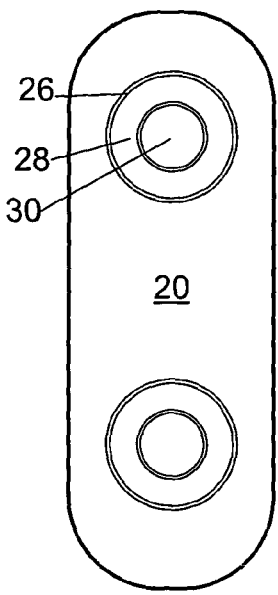
FIGS. 5b and 5c show side views of a guide link and a toothed link, respectively.
Figure 5C:
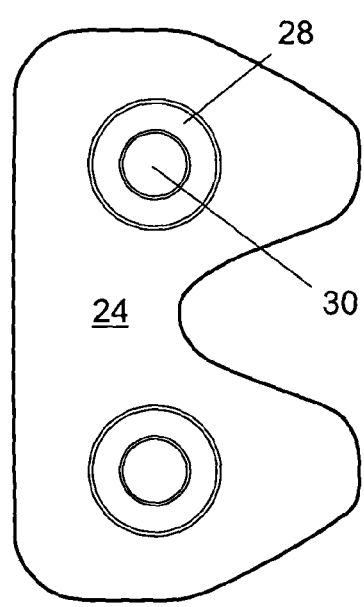

Referring to FIGS. 5a through 5c, a third embodiment of the present invention is shown. In this embodiment, the endless chain is similarly guided on the sprocket (not shown) by a center link 20 on the guide row, which fits into a groove (also not shown) of the sprockets. Center link 20 is non-inverted in shape as shown. The remaining links of the present figure are of the inverted tooth type. Inside link 24 is rigidly affixed upon bushing 28. For example, link 24 may be press fit on bushing 28. Therefore, no relative movements between the OD of bushing 28 and inside surface of link 24 occur. The use of center guide link in silent chains is well known in the art. However, the present invention provides for the center guide link 20 to fit over the outside diameter surface 26 of bushings 28, thereby providing additional bearing area to carry load. The total bearing area of this design is the sum of the pin 30 to bushing 28 bearing area (the area disposed for contact between the inner surface of bushing 28 and the outer surface of pin 30), and the bushing 28 to link 20 bearing area (the area disposed for contact between the outer surface 26 of bushing 28 and the inner surface of the apertures of the center link guide 20). As can be seen, by allowing part of the tensile load in the chain to be carried by the pin 30 to bushing 28 interface, and the remainder of the tensile load to be carried by the center guide link 20 to bushing 28 outside diameter (O.D.) interface, the net unit load between the pin 30 and bushing 28 is reduced, thereby causing reduced wear of the relevant portions of the chain. The torque transmitting contact between the chain and sprocket is through the links (22, 24) which are of the inverted tooth type, thereby providing the NVH performance of a silent chain.

Figure 6:
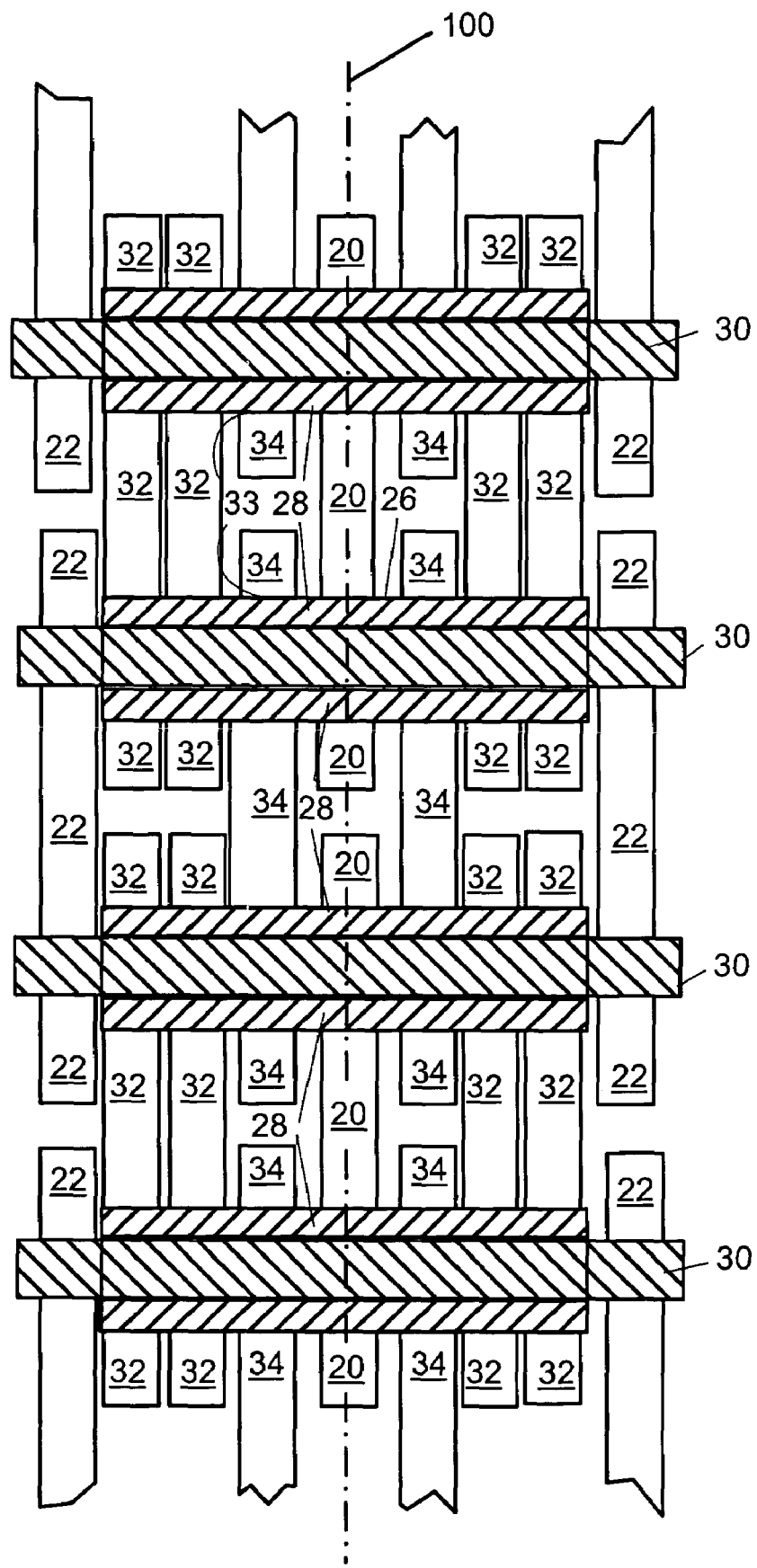
FIG. 6 shows a cross-sectional view of a fourth embodiment of the present invention.

A fourth embodiment is shown in FIG. 6. This embodiment shows a wider chain having more linking elements. A single center guide link 20 is provided along center line 100, in the first row. Furthermore, two pairs of inside links 32 are provided in the first row for higher strength. In this case, the center guide link 20, and the inside links 32 do not move relative to the bushing 28 O.D. Bearing area 33 is provided in which links 34 possess an inside aperture surface which articulates relative to the bushing 28 OD. The apertures of these links 34 bear against the O.D. of the bushing 28. Again, the pin 30 has full bearing area within the inner diameter (I.D.) of the bushing 28. As in the previous embodiments, additional bearing area between the articulating members is provided by utilizing the O.D. of the bushing 28 for bearing contact with one or more links in the guide row. Links 22, 32, and 34 are of the inverted tooth type, and mesh with the sprocket teeth, thereby providing the NVH performance of a silent chain.

It is noted that in any of the above embodiments, by providing the additional link(s) that bear against the O.D. of the bushing, the load carried by the pin 30 (relative to roller chains) is reduced. The reduction of the load carried by the pin 30 will reduce the wear between the pin 30 and bushing 28, resulting in a design that can have superior wear performance compared to a roller chain, while providing the NVH performance of a silent chain, by utilizing inverted tooth type links to contact the sprocket.

In operation, if there is any imbalance in the load sharing between links, the components will tend to wear in and improve the load sharing. For example, if the link 22 is carrying more than the ideal load, the pin 30 will wear more quickly, causing the center link(s) or other links (e.g. 34 or 20 in FIGS. 3, 4, and 5) in the same row to carry increased load, until a natural balance is achieved. This natural tendency to "wear-in" to a balanced situation will help to reduce the impact of dimensional tolerances on the performance of the chain.

Figure 7:
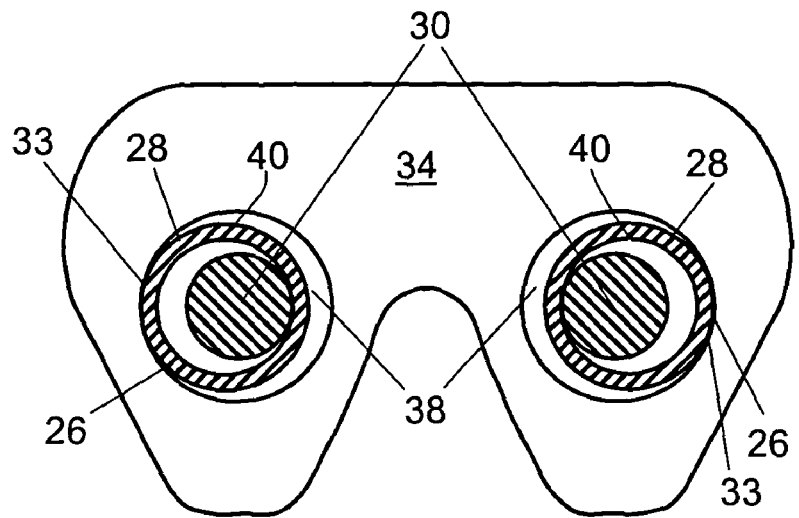
FIG. 7 shows a side view of a chain link with a cut-away view of a pin and bushing, along the section line 7—7 in FIG. 8.

Referring to FIG. 7, which is an exaggerated partial side view of a chain incorporating the present invention, a link forming part of an endless chain such as the link 34 is shown. The link has a pair of apertures 38. Each aperture 38 possesses a bearing area 33, which comes in contact with bushing 28 at outside surface 26. The pin 30 comes in contact with the inside surface 40 of the bushing. As can be appreciated, bearing area 33 forms an increased bearing area that shares the load of the endless chain.

More specifically, referring to the section shown in FIG. 7, the outside surface of the pins bear against the inside surface of the bushing and articulate against it. In the plane of the links (i.e. the paper of FIG. 7), the inside surface of the apertures in the guide row inside links (34) bear against the outer surface of the bushing, and articulate against it. This use of both inside surface and outside surface of the bushing in the same plane to carry load, allows increased bearing area for a given chain width.

In any of these embodiments, the thickness and number of the various links can be adjusted to optimize the strength and the wear resistance of the chain. The diameters of the pin, bushing I.D., and bushing O.D. can also be optimized to provide the best combination of strength and wear resistance. By providing maximum total bearing area between the articulating members of the chain, the wear resistance is optimized.

Figure 8:
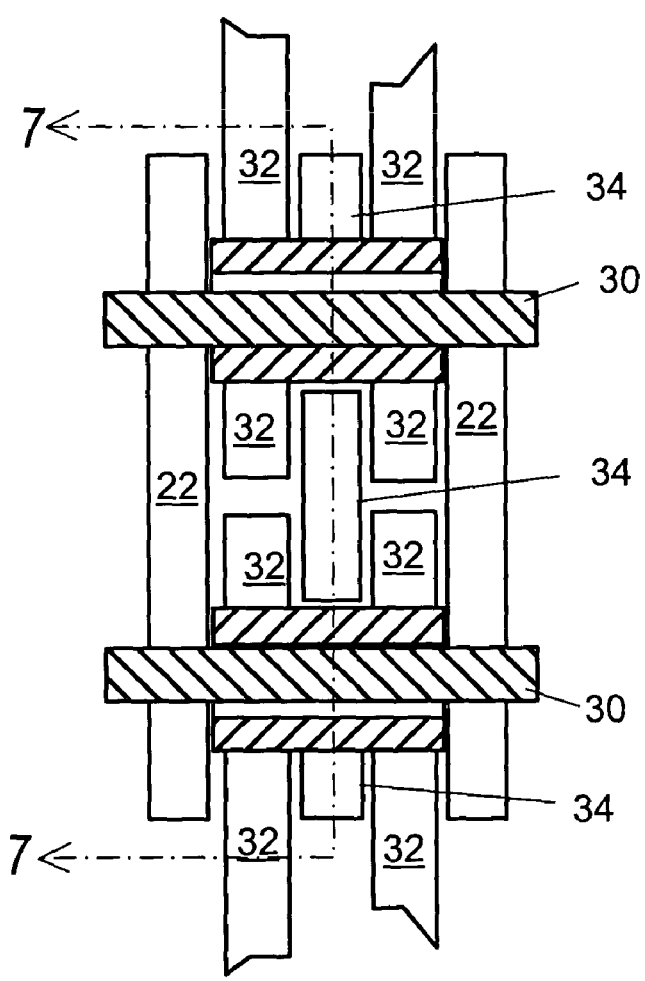
FIG. 8 shows a cross-sectional view of an embodiment of the invention using both inside and outside surfaces of the bushings as bearing areas.

A multiplicity of embodiments for this invention exists. The embodiment of the present invention shown in FIGS. 7 and 8 uses both the inside surface 40 and the outside surface 33 of the bushing 28 to carry load, providing large bearing area for wear resistance (at least as much bearing area as a roller chain) while allowing the use of silent chain links 34 and 32 for NVH. The load is transmitted to both the inside 40 and outside 30 surfaces of the bushing 28 thereby distributing the load. Further, the present invention allows for increased amounts of bearing area in a relatively limited chain width. The above is shown in FIG. 7, which is an exaggerated partial side view of a chain incorporating the present invention, and FIG. 8, which shows a section of a chain using the links of FIG. 7.

The present invention is an improvement over roller chain in that it has reduced wear by providing a new bearing surface between the outside of the bushing and one or more load carrying links, and by allowing reduced load through the pin. Further, in a traditional roller chain, all the tensile loads must go through the pin, and pin strength limitations can limit the load carrying capability of the chain. The improved chain of the present invention can potentially provide increased strength by reducing pin bending stress and transmitting a portion of the tensile force through the OD of the bushing to the load carrying link(s). The present invention further improves over roller chain by reducing noise due to providing some links with inverted tooth (silent) link profile that meshes with a silent chain type sprocket tooth profile It is noted that the present invention also contemplates a double-meshing-type silent chain capable of meshing with sprockets or toothed pulleys which are mounted on respective driven shafts located inside and outside the chain. For example a double-meshing-type silent chain being used as a timing chain for transmitting rotational motion from the crankshaft of an engine to the cam-shaft of the engine or to the shaft of an auxiliary device such as an oil pump. As can be appreciated, a double-meshing-type silent chain is employed when driven shafts located inside and outside the chain must be rotated in opposite directions.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A chain comprising a plurality of parallel links articulately connected together in rows along a direction of travel, comprising:

a plurality of first links, a plurality of second links, and a plurality of outside links, each of the links having a pair of apertures having a diameter and an inside surface;

a plurality of cylindrical bushings having an outer surface and an outside diameter, and an open center having an inside surface and an inside diameter, the bushings passing through the apertures of the first links and the second links; and a plurality of cylindrical pins having an outer surface and an outer diameter, passing through the apertures of the outside links and through the open center of the bushings, and having a bearing area for contact between the outer surface of the pin and the inner surface of the bushing, such that the outer surface of the pin can move relative to the inner surface of the bushing and carries load from the bushing;

the links being arranged in rows, alternating between a first row comprising at least one first link and a second row comprising at least one second link and at least one outside link on each edge of the chain;

the diameter of the apertures of the first links and the outside diameter of the bushings being tightly fit such that no relative movement occurs between the inner surface of the apertures and the outer surface of the bushings;

the diameter of the apertures of the second links being larger than the diameter of the apertures of the first links, and having a bearing area for contact between the outer surface of the bushing and the inner surface of the apertures, such that the outer surface of the bushing can move relative to the inside surface of the apertures of the second links and carries chain load;

the outside diameter of the pins being press-fit into the apertures of the outside links;

such that the chain is made up of alternating first rows of first links rigidly affixed to the bushings and second rows of second links movable on the bushings and outside links affixed to the pins.

2. The chain of claim 1, wherein the second links are positioned along a center line of the chain.

3. The chain of claim 2, wherein the second links are non-inverted center guide links.

4. The chain of claim 1, wherein each second row comprises a plurality of second links positioned symmetrically along a center line of the chain.

5. The chain of claim 1, wherein the second links are inverted-tooth links.

6. The chain of claim 1, wherein the outside links are inverted-tooth links.

7. The chain of claim 1, wherein the outside links are guide links.

8. The chain of claim 1, wherein the first links are inverted-tooth links.

9. The chain of claim 1, in which the outer diameter of the pins is sufficiently smaller than the inner diameter of the bushings such that relative movement is possible therebetween, the inner surface of the bushings forming a bearing surface against the outer surface of the pins.

10. A chain comprising a plurality of parallel links articulately connected together in rows along a direction of travel, comprising:

a plurality of first links, a plurality of second links and a plurality of outside links, each of the links having a pair of apertures having a diameter and an inside surface;

a plurality of cylindrical bushings having an outer surface and an outside diameter, and an open center having an inside surface and an inside diameter, the bushings passing through the apertures of the first links and the second links; and a plurality of cylindrical pins having an outer surface and an outer diameter, passing through the apertures of the outside links and through the open center of the bushings, the outer diameter of the pins being less than the inside diameter of the bushings, such that the pins may move within the open center of the bushings;

the diameter of the apertures of the first links and the outside diameter of the bushings being tightly fit such that no relative movement occurs between the inside surface of the apertures and the outer surface of the bushings;

the diameter of the apertures of second links being larger than the outside diameter of the bushings, such that the outer surface of the bushings can move relative to the inside surface of the apertures of the second links;

such that the outer surface of the pins bear and articulate against the inside surface of the bushings, and the inside surface of the apertures of the second links bear and articulate against the outer surface of the bushings, wherein both the inside surface and the outside surface of the bushings are used to carry chain load, allowing increased bearing area for a given chain width.

* * * * *